3,422,133
CYANOMETHYLIDENE-ANILINE DYE FOR
TEXTILE FIBERS
John I. Dale III and Max A. Weaver, Kingsport, Tenn.,
assignors to Eastman Kodak Company, Rochester,
N.Y., a corporation of New Jersey
No Drawing. Filed Oct. 22, 1965, Ser. No. 502,325
U.S. Cl. 260—465                         7 Claims
Int. Cl. C09b 23/00

ABSTRACT OF THE DISCLOSURE

Cyanomethylidene-aniline compounds having the general formula

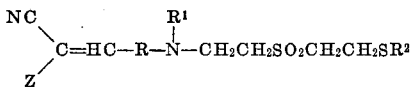

wherein R is phenylene, $R^1$ and $R^2$ each is alkyl or phenyl, and Z is cyano, —COO-alkyl, or —$CONH_2$ which are useful as dyes for hydrophobic fibers.

---

This invention relates to novel methine compounds and, particularly, to methine dyes for textile fibers, yarns and fabrics.

The novel methine dyes of the invention are characterized by the general formula

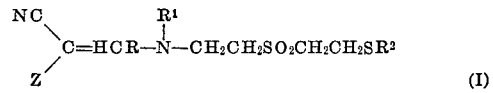

wherein

R represents a monocyclic carbocyclic aromatic radical of the benzene series, e.g. phenylene or substituted phenylene such as alkylphenylene, e.g. tolylene; alkoxyphenylene, e.g. methoxyphenylene; acylamidophenylene, e.g. acetamidophenylene, halophenylene, e.g. chlorophenylene and the like; or R represents a substituted or non-substituted 1,2,3,4-tetrahydroquinoline radical wherein the nitrogen of the heterocyclic ring is represented by N of the general formula; or R represents a substituted or non-substituted 2,3-dihydrobenzoxazine radical wherein the nitrogen of the heterocyclic ring is represented by N of the general formula; $R^1$ and $R^2$ represent alkyl, e.g. methyl, ethyl; substituted alkyl, e.g. hydroxyalkyl such as 2-hydroxyethyl; haloalkyl, e.g. 2-chloroethyl; alkoxyalkyl, e.g. 3-methoxypropyl; acyloxyalkyl, e.g. 2-acetoxyethyl; acylamidoalkyl, e.g. 3-acetamidopropyl; cyanoalkyl, e.g. 2-cyanoethyl; dicarboxylic acid imidoalkyl, e.g. succinimidoethyl; or phenyl and substituted phenyl such as alkylphenyl, e.g. tolyl; alkoxyphenyl, e.g. p-anisyl; halophenyl, e.g. m-chlorophenyl and the like; or $R^1$ may be part of the ring when R is heterocyclic; and Z represents cyano, —$COOCH_2CH_2CN$, lower —COO-alkyl, lower-$CON(alkyl)_2$ or —$CONH_2$.

In general, the novel dyes of the invention are prepared by reacting:

(a) An alkyl-, aryl-thiol compound with an appropriately substituted N-β-vinylsulfonylethylacylamine in an alcoholic medium using a small amount of base as catalyst, e.g.:

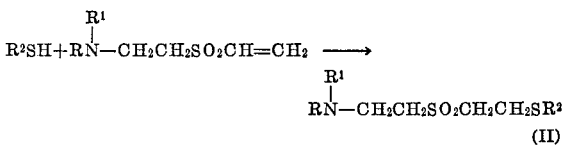

(b) Treating the compound represented by Formula II with $POCl_3$ and dimethylformamide to obtain the aldehyde derivative, e.g.:

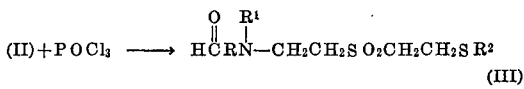

(c) Treating the aldehyde derivative of Formula III with a nitrile, amide or ester of a lower aliphatic dicarboxylic acid, such as malonic acid, to obtain the novel compounds represented by Formula I, e.g.:

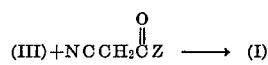

The N-β-vinylsulfonylethylarylamine reactant of step (a) above is prepared by reacting an appropriately substituted aniline, tetrahydroquinoline or dihydrobenzoxazine with divinylsulfone in the presence of acetic acid and a hydrocarbon solvent.

The methine dyes can be used for dyeing textile materials, including synthetic polymer fibers, yarns and fabrics, giving fast yellow to red-yellow shades when applied thereto by conventional dye methods. The dyes display excellent light- and sublimation-fastness and, in general, have superior fastness to washing and gas (atmospheric fumes).

The following examples will serve to illustrate the preparation of representative intermediates and methine compounds of the invention.

EXAMPLE 1

(a) Preparation of N-ethyl-N-β-(phenylthioethylsulfonyl)-ethyl-m-toluidine

An amount of 6.0 g. thiophenol, 12.6 g. N-ethyl-N-β-vinylsulfonylethyl-m-toluidine (prepared by reaction of N-ethyl-m-toluidine and divinylsulfone), 100 ml. absolute ethanol and 2 drops of triethylamine was stirred for 15 minutes. The solution was poured into 400 ml. ice water and the resulting gum was crystallized from alcohol. It has a melting point of 78.5–79°. A typical analysis: Calcd. for $C_{19}H_{25}NO_2S_2$: C, 62.8%; H, 6.9%; N, 3.9%; S, 17.6%. Found: C, 62.71%; H, 7.15%; N, 2.86%; S, 17.59%.

(b) Preparation of the aldehyde

An amount of 3.6 g. of the above product was dissolved in 15 ml. dimethylformamide, and the solution was cooled in an ice water bath during addition of 1.3 ml. of $POCl_3$. The reaction mixture was heated for 1 hour on the steam bath, drowned in $H_2O$ and the solution made basic with sodium hydroxide solution. The resulting precipitate was washed with $H_2O$ and crystallized from alcohol. It melted at 101.5–105°. A typical analysis: Calcd. for

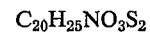

C, 61.4%; H, 6.4%; N, 3.6%; S, 16.4%. Found: C, 61.21%; H, 6.58%; N, 3.10%, 3.19%; S, 16.54%.

(c) Preparation of the dye

An amount of 1.8 g. of the above aldehyde was dissolved in 100 ml. alcohol, and 0.66 g. malonitrile and 3 drops piperidine were added. The solution was then heated 45 minutes on the steam bath. The yellow precipitate which formed dyes polyester, polyamide and cellulose acetate fibers bright yellow shades of excellent light fastness. It has the following structure:

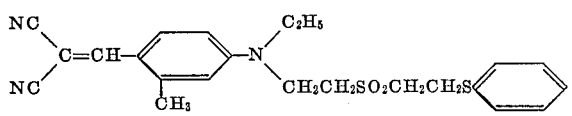

EXAMPLE 2

(a) Preparation of 1-[2-(2-phenylthioethylsulfonyl)ethyl]-2,2,4,7-tetramethyl-1,2,3,4-tetrahydroquinoline An amount of 6.0 g. thiophenol, 15.35 g. 2,2,4,7-tetramethyl-1,2,3,4-tetrahydro-1-$\beta$-vinylsulfonylethylquinoline, 100 ml. absolute ethanol and 2 drops triethylamine was stirred for 30 min. The solution was drowned in water and the precipitate obtained was crystalized from ethanol.

(b) Preparation of the aldehyde

An amount of 4.18 g. of the above product was dissolved in 15 ml. dimethylformamide and the solution was cooled in an ice bath during addition of 1.3 ml. POCl$_3$. The reaction mixture was heated for 1 hour on the steam bath, drowned in water and the solution made basic with sodium hydroxide solution. The resulting precipitate was washed with H$_2$O and crystallized from alcohol.

(c) Preparation of the dye

An amount of 2.28 g. of the above aldehyde, 0.66 g. malonitrile, 3 drops of piperidine and 100 ml. alcohol was heated on the steam bath for 1 hour. The yellow dye which precipitated dyes polyester, polyamide, and cellulose acetate fibers bright yellow shades of excellent light fastness. It has the structure:

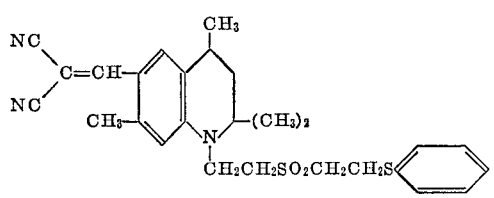

EXAMPLE 3

(a) Preparation of N-$\beta$-hydroxyethyl-N-$\beta$-(2-phenylthioethylsulfonyl)ethylaniline An amount of 6.0 g. thiophenol, 12.7 g. N-$\beta$-hydroxyethylaniline-N-$\beta$-vinylsulfonylethylaniline, 3 drops triethylamine and 100 ml. ethanol was stirred for 1 hr. The solution was then drowned in H$_2$O and water was decanted from the oil which separated. The product was taken up in chloroform, the solution dried over sodium sulfate and the chloroform was then evaporated.

(b) Preparation of the aldehyde

An amount of 3.7 g. of the above product was dissolved in 15 ml. dimethylformamide and the solution was cooled in an ice bath during addition of 1.3 ml. POCl$_3$. The reaction mixture was heated for 1 hr. on the steam bath, drowned in water and the solution made basic with sodium hydroxide solution. The product was taken up in 150 ml. ethanol but failed to crystallize.

(c) Preparation of the dye

An amount of 75 ml. of the above ethanol solution, 0.66 g. malonitrile and 3 drops of piperidine were heated for 1 hr. on the steam bath. The dye which precipitated dyes polyamide, polyester and cellulose acetate fibers light fast yellow shades. It has the structure:

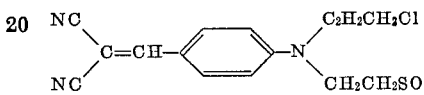

EXAMPLE 4

An amount of 1.95 g. of the aldehyde described in Example 1(b), 0.5 g. 2-cyanoacetamide, 3 drops piperidine and 100 ml. alcohol was heated on the steam bath for 1 hr. On cooling, a dye separated which gives light fast bright yellow shades on cellulose acetate, polyester and polyamide fibers. It has the structure:

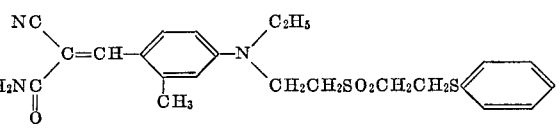

EXAMPLE 5

An amount of 1.95 g. of the aldehyde prepared as in Example 1(b), 0.75 g. methylcyanoacetate, 3 drops piperidine and 100 ml. alcohol was heated on the steam bath for 1 hr. On cooling, a yellow dye separated which gives light fast shades on cellulose acetate, polyester and polyamide fibers. It has the structure:

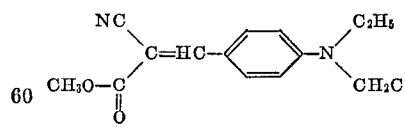

Methine dyes characterized by Formula I and having substituents as illustrated in the following table were prepared by the method illustrated in Examples 1–5. Thus, the intermediate $\beta$-vinylsulfonylethylamine was prepared by the reaction of the appropriately substituted aniline, tetrahydroquinoline or dihydrobenzoxazine with divinylsulfone as set forth above. Thiol addition, aldehyde formation and dye preparation were then carried out as set forth in the above examples. Each of the products dyes polyesters, polyamides and cellulose acetate fast bright yellow to red-yellow shades.

TABLE

| Example No. | R | $R_1$ | $R_2$ | Z |
|---|---|---|---|---|
| 6 | Phenylene | $-C_2H_5$ | p-Tolyl | $-CN$ |
| 7 | m-Tolylene | $-CH_3$ | p-Chlorophenyl | $-CN$ |
| 8 | do | $-CH_3$ | p-$CH_3OC_6H_4$ | $-\overset{O}{\overset{\|}{C}}NH_2$ |
| 9 | do | $-C_4H_9(n)$ | $ClCH_2CH_2-$ | $-\overset{O}{\overset{\|}{C}}-OCH_3$ |
| 10 | do | $-C_2H_5$ | $CH_3OCH_2CH_2-$ | $-\overset{O}{\overset{\|}{C}}-OCH_2CH(CH_3)_2$ |
| 11 | Phenylene | $-C_2H_4Cl$ | $CH_3\overset{O}{\overset{\|}{C}}OC_2H_4-$ | $-CN$ |
| 12 | do | $-C_2H_4CN$ | $-CH_3$ | $-CN$ |
| 13 | m-Chlorophenylene | $-C_2H_4CN$ | $-C_2H_4CN$ | $-CN$ |
| 14 | Tetrahydroquinoline | Part of ring | $-CH_2CH_2CONH_2$ | $-CN$ |
| 15 | 2,7-dimethyltetrahydroquinoline | do | Phenyl | $-CN$ |
| 16 | 7-methyltetrahydroquinoline | do | $-C_2H_5$ | $-CN$ |
| 17 | m-$OCH_3$phenylene | $-C_2H_5$ | $-CH_2CH_2N\begin{smallmatrix}COCH_3\\ \\ COCH_3\end{smallmatrix}$ | $-CN$ |
| 18 | m-$OCH_3$phenylene | $-C_6H_5$ | $-CH\begin{smallmatrix}CH_3\\ \\ CH_3\end{smallmatrix}$ | $-CN$ |
| 19 | o-Tolylene | $-C_2H_5$ | $-C_2H_4NHCOCH_3$ | $-CN$ |
| 20 | m-Tolylene | $-C_2H_4OCH_3$ | $-C_2H_5$ | $-CN$ |
| 21 | do | $-C_2H_4NHCOCH_3$ | $-Phenyl$ | $-CN$ |
| 22 | m-Tolylene | $C_2H_4N\begin{smallmatrix}COCH_3\\ \\ COCH_3\end{smallmatrix}$ | $-CH_3$ | $-CN$ |
| 23 | Phenylene | $-C_2H_4O\overset{O}{\overset{\|}{C}}CH_3$ | p-$CH_3CONH$-phenyl | $-CN$ |
| 24 | m-Acetylaminophenylene | $-C_2H_5$ | Phenyl | $-CN$ |
| 25 | 2,7-dimethyl-2,3-dihydro-benzoxazine | Part of ring | do | $-CN$ |

As described above, the present methine dyes possess a characteristically distinct structure. This distinctive structure imparts unexpected properties to the present compounds, especially when they are used for dyeing textiles.

Thus, the present methine compounds in general can be expected to be superior to similar dyes when tested by methods such as described in the A.A.T.C.C. Technical Manual, 1964 edition, depending in part upon the particular dye used and the fiber being dyed.

The methine compounds of the invention may be used for dyeing hydrophobic fibers such as linear polyester, cellulose ester, modacrylic, etc., fibers in the manner described in U.S. Patents 2,880,050, 2,757,064, 2,782,187 and 2,043,827. The following examples illustrate methods by which the methine compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the methine compounds of the invention are water-insoluble, they can be applied from aqueous dispersions in the manner of the so-called "dispersed dyes." However, coloration can also be effected, for example, by incorporating the methine compounds into the spinning dope and spinning the fiber as usual. The methine compounds of the invention have varying utility as dyes. The degree of utility varies, for example, depending upon the material being dyed and the formula of the methine compound. Thus, for example, all the dyes will not have the same degree of utility for the same material. As mentioned above, the substituents on the R, $R_1$ and $R_2$ radicals serve primarily as auxochrome groups to control the color of the methine compound.

Polymeric linear polyester materials of the terephthalate type are illustrative of the linear aromatic polyester textile materials that can be dyed with the new methine compounds of our invention. The terephthalate fibers sold under the trademarks "Kodel," "Dacron," and "Terylene," for example, in the form of filaments, yarn and fabric, for example, are illustrative of the polyester textile materials that can be dyed. The linear aromatic polyester materials specifically named have a melting point of at least 200° C.

Nylon, in fiber, yarn and fabric form, is representative of polyamides which can be dyed with the methine compounds.

The invention has been described in considerable detail with particular reference to certain preferred embodiments thereof, but it will be understood that variations and modifications can be effected within the spirit and scope of the invention as described hereinabove and as defined in the appended claims.

What we claim is:
1. A methine compound having the formula

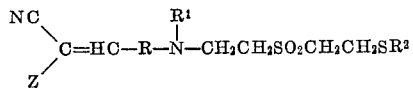

wherein
R represents p-phenylene, monomethyl-p-phenylene, monomethoxy-p-phenylene, monochloro-p-phenylene or monoacetamido-p-phenylene;
$R^1$ represents alkyl, monohydroxyalkyl, monochloroalkyl, monomethoxyalkyl, monoacetoxyalkyl, monoacetamidoalkyl, monocyanoalkyl, or phenyl;
$R^2$ represents alkyl, monohydroxyalkyl, monochloroalkyl, monomethoxyalkyl, monoacetoxyalkyl, monoacetamidoalkyl, monocyanoalkyl, phenyl, tolyl, anisyl, monochlorophenyl, or monoacetamidophenyl; and
Z represents cyano, —COO-alkyl, or —CONH$_2$—, in which the alkyl groups contain from 1 to 4 carbon atoms.

2. A methine compound according to claim 1 wherein R represents p-phenylene or monomethyl-p-phenylene; $R^1$ represents alkyl of 1 to 4 carbon atoms, 2-chloroethyl, 2-cyanoethyl, 2-methoxyethyl, 2-acetoxyethyl, or 2-hydroxyethyl;
$R^2$ represents phenyl or tolyl; and
Z represents cyano.

3. The dye:

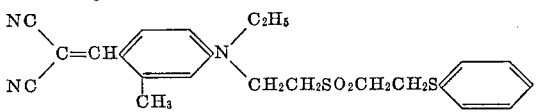

4. The dye:

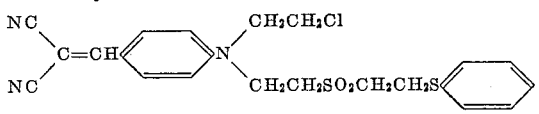

5. The dye:

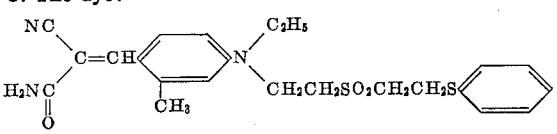

6. The dye:

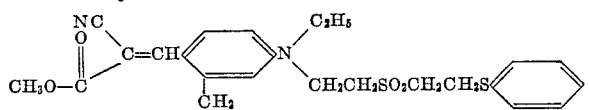

7. The dye:

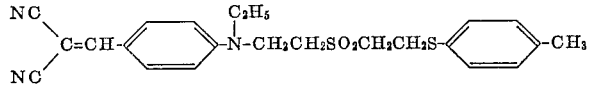

References Cited

UNITED STATES PATENTS 3,082,238   3/1963   Dunbar _____ 260—456

CHARLES B. PARKER, *Primary Examiner.*

S. T. LAWRENCE III, *Assistant Examiner.*

U.S. Cl.. XR.

8—55; 260—244, 281, 283, 287, 289